United States Patent
Barnes

[15] 3,653,445
[45] Apr. 4, 1972

[54] BEET HARVESTER
[72] Inventor: Andrew F. Barnes, R.R. 1 Box 292, Longmont, Colo. 80501
[22] Filed: Nov. 19, 1970
[21] Appl. No.: 90,901

[52] U.S. Cl. ............................................................. 171/58
[51] Int. Cl. ....................................................... A01d 17/00
[58] Field of Search .................... 171/58, 28, 14, 133, 25, 8; 15/3.11

[56] References Cited

UNITED STATES PATENTS

| | | | |
|---|---|---|---|
| 2,972,383 | 2/1961 | Erdman | 171/58 |
| 3,267,502 | 7/1966 | Wells | 171/58 |
| 3,294,177 | 12/1966 | Schaal et al. | 171/133 |
| 3,387,612 | 6/1968 | Tillotson | 171/28 |

*Primary Examiner*—Antonio F. Guida
*Attorney*—McDougal, Hersh & Scott

[57] ABSTRACT

This invention is addressed to an improved beet harvester including a hugger chain assembly forming a forward hugger chain and a rearward hugger chain, each of which include a rising portion with the rising portions of each of the hugger chains being substantially parallel to thereby define a space therebetween adapted to receive beets in a pressure engagement to elevate and clean the beets, with the rear hugger chain including a conveyor portion which extends in a forward direction to receive beets removed from the ground by lifter wheels for feeding the beets so removed to the space defined by the rising portions of the hugger chains to further enhance the cleaning, and a grab roll bed communicating with the space between the rising portions of the hugger chains including at least two pair of driven rolls to further clean the beets fed to the grab rolls from the hugger chain assembly.

16 Claims, 5 Drawing Figures

Patented April 4, 1972

3,653,445

INVENTOR
Andrew J. Barnes
by McDougall Hersh
and Scott Atty's

BEET HARVESTER

This invention relates to a new and improved device for harvesting sugar beets.

Devices for use in sectional sugar beets generally perform four separate functions. First, the harvester serves to dig or otherwise remove sugar beets from the earth; second, the harvester should separate the beets from dirt and miscellaneous debris; and, third, the harvester should preferably serve to temporarily store and/or transport the beets on the harvester. And finally, the harvester should provide means for loading the harvested and cleaned beets into an adjacent transport vehicle, such as a truck.

Beet harvesters are generally classified into three types or styles of machines, namely, the tank type, the direct load or lifter loader type and the semi-tank type. The tank-type harvester is so named because of its capability for storing relatively large quantities of beets. Accordingly, tank-type machines include what is frequently referred to as a holding tank which serves to accumulate or store beets harvested during operation of the harvester,, and subsequently off-loaded into a suitable transport vehicle. This type of machine is particularly advantageous during harvesting operations in which field conditions do not permit efficient operation of a truck or similar transport vehicle through the field in that the tank-type harvester permit the beets to be off-loaded to a transport vehicle at the edge of a field. Because of the ability to store the harvested beets, this type of machine most frequently provides the most desirable overall efficiency.

The direct loader or lifter loader type of beet harvester differs from the tank-type harvesters primarily due to the fact that the direct loader type of beet harvester requires that a transport vehicle be available to receive the harvested beets almost all of the time defining the harvester is in operation.

The third type of harvester, the semi-tank type machine, represents a combination of the machine types described above in that the semi-tank type of machine is provided with a limited storage capacity and therefore does not require the continuous presence of a transport vehicle as is the case with the direct-loader type of machine. Thus, the field efficiency for the semi-tank type of harvester is somewhat greater than that of the direct-loader machine in that waiting time for positioning of the transport vehicle is minimized.

Regardless of the type, most beet harvester include lifter wheels which serve to remove the beets from the earth and paddles which serve to remove the beets removed from the earth from the lifter wheels. Such lifter wheels and paddles are well known to those skilled in the art, and are described in U.S. Pat. Nos. 2,682,739, 2,763,113, 2,944,611, 3,010,522, 3,183,976, and 3,191,686. As is described in the aforementioned patents, beet harvesters are generally provided with one or more pairs of lifter wheels, and each of the wheels of each pair is mounted on an angular spindle whereby each of the wheels of the pair are inclined toward the other at a point generally referred to as the pinch point. At the pinch point, the wheels are relatively close each to the other (from about 1 to 2 inches); at a point opposite the pinch point, the periphery of the wheels are spread apart.

In operation, the lifter wheels penetrate the soil to a depth of about 2 to 3 inches. Since the wheels are free rolling and ground driven, each pair of lifter wheels is driven as the harvester is advanced along a row or rows of beets. The angle defined by the planes of each of the wheels of a pair is such that from the time a point on the periphery of a wheel enters the ground and is rotated through its lowest point and then back up to the surface of the soil, the width or gap between the periphery of the wheels of each pair is continually diminishing. The pinch point is located at the ground surface or slightly above a point on the wheel leaves the ground, whereby, as the harvester is advanced along a row of beets, each pair of lifter wheels exerts lateral compressive forces to thereby force soil against the beet, causing the beet to pop out of the ground because of its tapered shape.

The rotating pair of lifter wheels continues to carry the beet and associated dirt upwardly to a point at which a paddle, such as a rotating paddle, deflects the beet from between the increasing gap defined by the pair of wheels to the next conveying element.

Beet harvesters of the prior art most frequently are provided with what is known in the art as a renk bed which serves to elevate the beets removed from the lifter wheels and to remove dirt and miscellaneous debris adhering to the beets. From the renk bed, the beets are usually passed to a holding tank in the tank type or semi-tank type of machine for subsequent off-loading by means of a conventional conveyor and/or elevator. In the case of the direct loader type of harvesters, the beets from the renk bed are directly off-loaded from the harvester, frequently by means of conventional conveyors and/or elevators.

The renk beds described above are generally formed of a plurality of rotating plate elements having various configuration including disk, star, hexagonal, octagonal, etc. configurations, mounted on rotating horizontal shafts. As the shafts are rotated, the elements are similarly rotated and serve to convey beets through the bed. The plate elements are spaced each from the other, and strike the beets in the bed to break up clods of dirt and debris for removal from the bed as the beets are advanced through the bed.

Renk beds of the type described generally provide only satisfactory dirt removal during operation. In addition, renk beds of the type described tend to jam, particularly under muddy conditions, and therefore are generally unsatisfactory for use in beet harvesting machines.

It is accordingly an object of the present invention to provide a beet harvester characterized by improved beet cleaning capabilities.

It is a more specific object of the invention to provide a new and improved beet harvester including a hugger chain assembly and a grab roll assembly for harvesting and cleaning beets characterized by improved resistance to jamming.

These and other objects and advantages of the invention will appear more fully hereinafter and, for purposes of illustration, but not of limitation, an embodiment of the invention is shown in the accompanying drawing in which.

The concepts of the present invention reside in a new and improved beet harvester including at least one pair of lifter wheels and at least one paddle means associated therewith, and a hugger chain assembly including a forward hugger chain and a rear hugger chain, each of which define a path including rising portions which are substantially parallel to define a space therebetween adapted to receive beets in pressure or hugging engagement whereby, as the chains are advanced through the parallel portions of their paths, the chains serve to elevate and clean the beets to remove dirt and debris therefrom.

One of the important features of the harvester of this invention is that the rear hugger chain also includes a substantially horizontal portion extending in a forward direction to thereby define a substantially horizontally conveyor portion in which the chain is advanced in a rearward direction whereby the beet deflected onto the conveyor portion by the paddles are conveyed to the space between the hugger chains to minimize jamming of the machine.

Another important feature of the harvester of this invention includes a set of grab rolls in the form of at least two pairs of parallel rollers in which each roller in each pair is rotating in a direction opposite to the direction in which the other roller of the pair is rotated, and thus serve to create a tumbling action to further enhance the cleaning of the beets.

Figure 1:
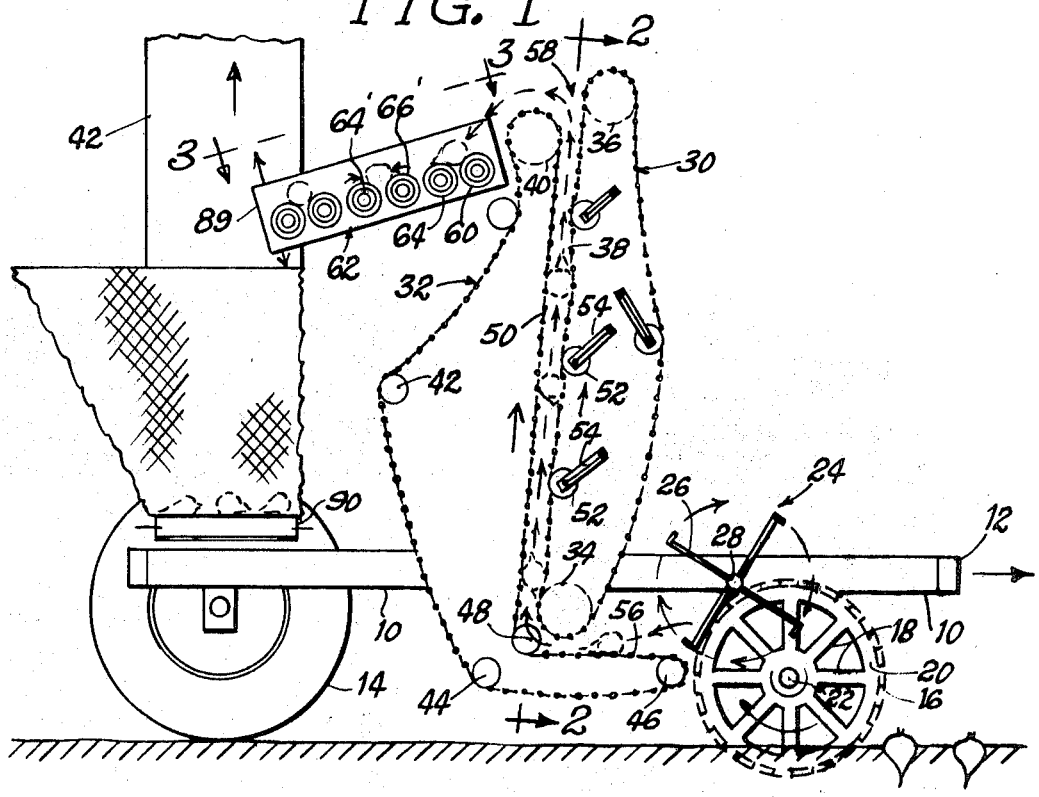
FIG. 1 is an elevational view of a beet harvester embodying the features of this invention.

Referring now to the drawings, there is shown in FIG. 1 a beet harvester embodying the features of this invention including a mobile frame 10 which is adapted to be towed by a tractor or the like by coupling means 12 and which is carried at its rearward end by suitable wheels 14, such as pneumatic tires. Mounted toward the forward end of the harvester is at least one pair of lifter wheels 16 which are of the type described in the U.S. patents referred to above. As described above, lifter wheels 16 each include spokes 18 emanating from a hub mounted on an axle 22, and carrying a peripheral portion 20 which is adapted to penetrate the soil to effect removal of beet therefrom in the manner described. While not illustrated in the drawings for the sake of simplicity, it is generally preferred that axle 22 be movable in a generally vertical direction by means of a pneumatic or hydraulic cylinder or the like to raise the lifter wheels 16 when not in use in accordance with conventional procedures.

Associated with each pair of lifter wheels 16 is at least one paddle means 24 mounted slightly above and to the rear of the pair of lifter wheels 16. As shown in FIG. 1, the paddle means 24 includes a plurality of flat paddle elements 26 rotatably mounted on a driven axle 28. The paddle means 24 is mounted sufficiently close to the pair of lifter wheels 16 such that the paddle elements 26 sweep the spaced defined by the periphery of the lifter wheels forming the pair 16 to deflect beets removed from the ground and carried upwardly with lifter wheels from between the perpheries. The deflection caused by the paddle elements serve a secondary, but important function of subjecting the beets to an impact force to aid in dislodging dirt and debris adhering to the beets.

Mounted to the rear of the paddle means 24 is the hugger chain assembly including a forward hugger chain 30 and a rear hugger chain 32. As is shown in FIG. 1, forward hugger chain 30 is an endless chain carried on vertically spaced pulleys 34 and 36, at least one of which is driven by suitable means not illustrated in the drawing. The path of the forward hugger chain includes a substantially vertical rising portion 38, and the chain 30 is driven in a direction by one or both of the pulleys 34 and 36 that the substantially vertical portion 38 of forward hugger chain 30 is advanced in an upward direction shown in FIG. 1.

The endless rear hugger chain 32 is carried by pulleys 40, 42, 44, 46, and 48, any one or more of which can be driven, and defines a path which includes a substantially vertical rising portion 50 which is substantially parallel to the corresponding vertical rising portion 38 of forward hugger chain 30, but spaced therefrom whereby rising portions 38 and 50 of the hugger chains define a space therebetween adapted to receive beets in pressure or hugging engagement. Rear hugger chain is similarly driven in a direction such that the rising portion 50 is likewise advanced in an upward direction.

In the preferred embodiment of the invention, one or more of the forward and rear hugger chains includes means constantly urging at least one of the rising portions 38 and 50 toward the other to ensure pressure engagement of the portions 38 and 50 with beets contained therebetween. This can conveniently be accomplished through the use of one or more rollers 52 biased against one of the chains, such as the forward hugger chain, by levers 54 as shown in FIG. 1, which serve to constantly urge rising portion 38 of the forward hugger chain 30 toward the corresponding rising portion 50 of rear hugger chain 32. This same type of arrangement can also be employed to maintain the desired tension in the hugger chains as desired.

As illustrated in FIG. 1, the lower portion of rear hugger chain 32 extends in a forward direction under pulley 48 and over pulley 46 to form a substantially horizontal conveyor portion 56 which projects under the forward hugger chain 30 and terminates adjacent to lifter wheels 16 and paddle means 24. The conveyor portion is advanced in a rearward direction whereby beets which are removed from the soil by lifter wheels 16 and deflected onto conveyor portion 56 by paddle means 24 are transported on the conveyor portion 56 to the space defined between the rising portions 38 and 50 of the forward and rear hugger chains, respectively.

Thus, in operation, beets are removed from the ground by means of the lifter wheels 16 and deflected onto the conveyor portion 56 of the rear hugger chain, by which they are advanced into the space defined between the hugger chains. The portions 38 and 50 of the hugger chains are advanced in an upward direction while in pressure engagement with beets contained in the space defined therebetween to elevate and clean the beets. Since the rising portions of forward and rear hugger chains 30 and 32 are nearly vertical, the upper portion of these chains defines a pocket 58 in which the beets advanced upwardly through the space defined between the rising portions are caused to tumble therein and further enhance the cleaning of the beets until other beets force the tumbled beets out of pocket 58 and roller 40, which is set at a height slightly below the high or roller 36 to ensure that the beets discharged from the pocket 58 will be passed rearwardly. It is possible, and frequently desirable to make the pocket adjustable to enable the extent of the tumbling action to be controlled. This can be conveniently accomplished by mounting one or both of the pulleys 36 and 40 in a manner whereby the distance between them can be varied.

By way of modification, it is possible to cause the forward and rear hugger chains to operate at slightly different speeds to increase the severity of the abrasive effect exerted on the beets while the beets are confined between the rising portions of the hugger chains. For example, the means driving the forward and rear hugger chains can be means which drive the forward hugger chain at a linear speed which is slightly greater than that of the rear hugger chain. For this purpose, use can be made of conventional gear boxes or the like driven by an independent power source on the harvester or an external power source, such as the power take off provided on a towing tractor.

Figure 2:
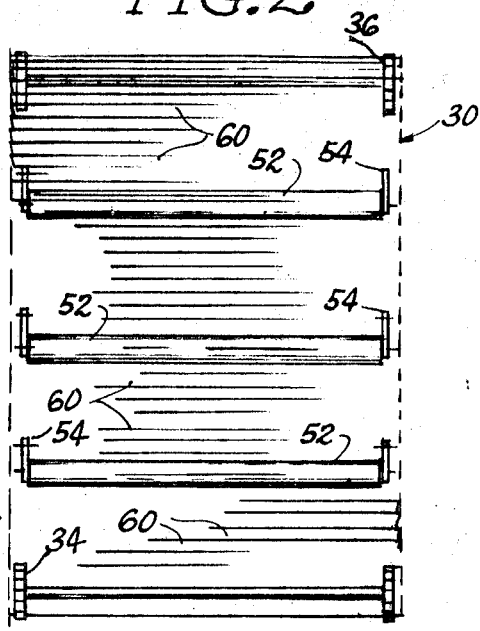
FIG. 2 is a sectional view taken along the line 2—2 in FIG. 1.

Continuing with the description of the harvester, the details of the construction of the hugger chains is best illustrated in FIG. 2 of the drawing. As is shown in this figure, the hugger chains 30 and 32 are preferably formed of horizontal bars 60 linked together to form an endless chain. For best results, the hugger chains should extend substantially over the entire width of the harvester to prevent congestion of the beets following removal of the beets from the lifter wheels 16 by paddle means 24.

Positioned near the top and to the rear of the rising portion 50 of the rear hugger chain 50 is a bed 52 of grab rollers which serve to further clean the beets after they are discharged from the upper portion of the space defined between the rising portions 38 and 50 of the hugger chains. As shown in FIG. 1, the bed 62 of grab rollers is formed of two or more pairs of rollers, with one of the rollers of each pair being driven in one direction and the other of the rollers of the pair being driven in the opposite direction. It is generally preferred that each roller of a pair be driven in a direction toward the other roller of the pair. Thus, rollers 64 and 64' are driven in a clockwise direction while the other rollers of the pairs, 66 and 66', respectively, are driven in a counter-clockwise direction. As will be appreciated by those skilled in the art, the beets discharged from the hugger chain assembly flow in a direction transverse, and preferably perpendicular as shown in FIG. 1, to the axis of the grab rollers whereby the surfaces of the rollers rub against the beets and thereby exert a cleaning action thereon.

The cleaning action exerted by the rollers of the bed 62 of grab rollers can be increased by forming one or both of the rollers 64 and 66 of each pair with a pattern on the peripheral surfaces thereof, including ridges, spirals, etc.

As is apparent in FIG. 1, the bed 62 of grab rollers is formed of a plurality of rollers which generally lie in the same plane, with the bed and/or the plane of the rollers from the bed being inclined with respect to the horizontal. The cleaning effect of the grab rollers is in part related to the angle of inclination of the bed, with the greatest slope of the bed 62 resulting in the least severe cleaning. For this reason, it is frequently desirable that the bed 62 be pivotally mounted such that the height of the rear end of bed 62 can be adjusted in the directions shown by the arrows in FIG. 1 to allow the slope or angle of inclination of the bed and consequently the severity of grab roller cleaning to be adjusted.

Figure 3:
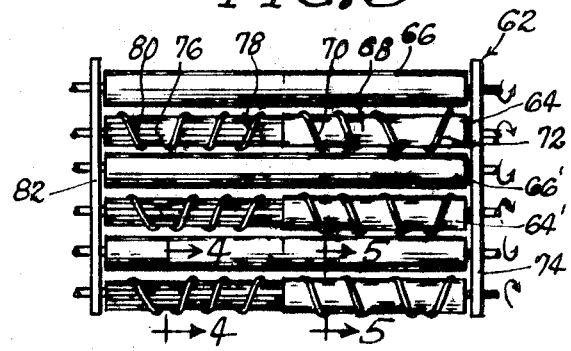
FIG. 3 is a top view taken along the line 3—3 in FIG. 1.
Figure 5:
FIG. 5 is a sectional view taken along the line 5—5 in FIG. 3.

The most preferred construction of the grab roller bed 62 is illustrated in FIG. 3 of the drawing. As shown in this figure, one roller 66 is formed with a substantially smooth peripheral surface. whereas the other roller 64 of the pair is formed with a portion of the peripheral surface 68 being substantially smooth, but having a spiral ridge 70 thereon to displace beets laterally toward the wall 74 of the bed. However, portion 68 also includes a reverse spiral 72 near the end thereof to prevent the build-up of beets near wall 74. The cross section of this portion of roller 64 is shown in FIG. 5.

The other portion 76 is formed of a rough surface, but is also provided with a spiral ridge 78, corresponding to ridge 70 but in the opposite direction, to displace beets laterally toward the opposite wall 82, and a reverse spiral 80 to prevent the build-up of beets along wall 82. It has been found that the overall effect of a grab roller construction as described is to distribute the beets in the bed over substantially the entire width of the bed, which should extend over the entire width of the harvester for best results.

Figure 4:
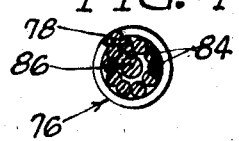
FIG. 4 is a sectional view taken along the line 4—4 in FIG. 3.

The rough or textured surface of portion 76 of grab roller 64, which preferably represents about half of the width of roller 64 is preferably provided by forming that portion of the roller of a plurality of rods 84 with the axes of rods 84 defining a cylinder about a shaft 86 as shown in FIG. 4 of the drawing. It has been found that grab rollers formed in part in this way provided excellent cleaning while minimizing the tendency of the grab rollers to jam from the presence of rocks or the like.

In the case of tank-type or semi-tank type harvesters and as shown in FIG. 1, the beets cleaned in bed 62 are discharged gravitationally from the open end 89 thereof into a hopper 88. Hopper 88 includes a conveyor 90 in the bottom thereof which extends in a direction transverse to the direction of flow of beets through the harvester and transport the cleaned beets to a conventional elevator 92 for off-loading as desired. However, it will be apparent to those skilled in the art that the concepts of the present invention are likewise applicable to direct loader-type harvester, in which case the beets discharged from grab roller bed 62 are off-loaded directly.

It will similarly be apparent that while the invention has been described above with reference to a towed harvester, the concepts of the invention are similarly applicable to self-propelled harvesters as well as vehicle mounted harvesters.

It will be apparent that various changes and modifications can be made in the details of construction and use without departing from the spirit of the invention, especially as defined in the following claims.

I claim:

1. In a beet harvester including lifter wheel means for removing beets from the soil and paddle means for deflecting removed beets from the lifter wheels, the improvement comprising a hugger chain assembly including a continuous forward hugger chain and a continuous rear hugger chain, each of said hugger chains including a rising portion with the rising portions of each hugger chain being in a substantially parallel relation to define a space therebetween adapted to receive beets in pressure engagement to elevate and clean the beets as the rising portions of the hugger chains are advanced in a generally upward direction, the rear hugger chain including a conveyor portion which extends in a forward substantially horizontal direction adjacent to said paddle means to receive beets deflected thereby whereby beets deflected onto the conveyor portion are fed during the advancement of the hugger chains to the space defined by the rising portions of the hugger chains, and a grab roll bed communicating with the space between the rising portions of the hugger chains, said bed including at least two pair of rollers adapted to be driven to clean beets fed to the grab roll bed.

2. A harvester as defined in claim 1 which includes means to drive the forward hugger chain and the rear hugger chain.

3. A harvester as defined in claim 1 wherein the rising portions of the hugger chains extend in a substantially vertical direction.

4. A harvester as defined in claim 1 which includes means to constantly urge at least one of the rising portions of the hugger chains toward the other.

5. A harvester as defined in claim 4 wherein said means includes a biased roller.

6. A harvester as defined in claim 1 wherein the upper portions of the hugger chains define a pocket whereby the beets passed into the pocket are given a tumbling motion to enhance the cleaning of the beets.

7. A harvester as defined in claim 1 wherein the hugger chains are dimensioned to extend over substantially the entire width of the harvester.

8. A harvester as defined in claim 1 wherein the driven rollers of the grab roll bed extend in a direction transverse to the direction of flow of beets through the harvester over substantially the entire width thereof.

9. A harvester as defined in claim 1 wherein one driven roller of each pair of rollers contains a pattern on the surface thereof to enhance the cleaning action of the rollers.

10. A harvester as defined in claim 9 wherein the other roller is formed of a substantially smooth peripheral surface.

11. A harvester as defined in claim 1 wherein the driven roller of each pair are driven in opposite directions.

12. A harvester as defined in claim 11 wherein the driven rollers of each pair are driven in a direction toward the other roller of the pair.

13. A harvester as defined in claim 9 wherein said one driven roller contains a first portion having a substantially smooth peripheral surface and first spiral ridge means on said surface to distribute the beets over the bed and a second portion having a textured peripheral surface and second spiral ridge means on the textured surface, with the first and second spiral ridge means being formed of opposite spiral means.

14. A harvester as defined in claim 13 wherein each of the first and second spiral ridge means includes a reverse spiral at the outer edges thereof.

15. A harvester as defined in claim 2 wherein the forward and rear hugger chains are adapted to be driven at different speeds.

16. A harvester as defined in claim 2 wherein the forward hugger chain is adapted to be driven at a rate faster than that of the rear hugger chain.

* * * * *

UNITED STATES PATENT OFFICE

CERTIFICATE OF CORRECTION

Patent No. 3,653,445　　　　　　　　　Dated April 4, 1972

Andrew F. Barnes

It is certified that errors appear in the above identified patent and that said Letters Patent are hereby corrected as shown below:

Column 1, line 5, change "sectional" to --harvesting--

Column 1, line 16, change "load" to --loader--

Column 1, line 33, after "of" insert --machine is not equipped with a holding tank. Thus, this type of--

Column 2, line 69, change "beet" to --beets--

Signed and sealed this 28th day of November 1972.

(SEAL)
Attest:

EDWARD M. FLETCHER, JR.　　　　　　　　ROBERT GOTTSCHALK
Attesting Officer　　　　　　　　　　　Commissioner of Patents